(12) United States Patent
Hendricksen

(10) Patent No.: US 9,700,838 B2
(45) Date of Patent: *Jul. 11, 2017

(54) CIRCULATING DRY SCRUBBER SYSTEM AND METHOD

(71) Applicant: MARSULEX ENVIRONMENTAL TECHNOLOGIES CORPORATION, Lebanon, PA (US)

(72) Inventor: Rodney Alan Hendricksen, Clinton, NJ (US)

(73) Assignee: Marsulx Environmental Technologies Corporation, Lebanon, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,655

(22) Filed: Apr. 4, 2016

(65) Prior Publication Data

US 2016/0243497 A1    Aug. 25, 2016

Related U.S. Application Data

(62) Division of application No. 14/505,879, filed on Oct. 3, 2014, now Pat. No. 9,327,232.

(60) Provisional application No. 61/886,989, filed on Oct. 4, 2013.

(51) Int. Cl.
| | | |
|---|---|---|
| *B01D 53/40* | (2006.01) |
| *F23J 15/02* | (2006.01) |
| *B01D 53/83* | (2006.01) |
| *B01D 53/50* | (2006.01) |
| *B01D 46/02* | (2006.01) |
| *B01D 53/68* | (2006.01) |

(52) U.S. Cl.
CPC ............. *B01D 53/40* (2013.01); *B01D 53/83* (2013.01); *F23J 15/025* (2013.01); *B01D 46/02* (2013.01); *B01D 53/508* (2013.01); *B01D 53/685* (2013.01); *B01D 2251/404* (2013.01); *B01D 2251/604* (2013.01); *B01D 2257/2045* (2013.01); *B01D 2257/2047* (2013.01); *B01D 2257/302* (2013.01); *B01D 2258/0283* (2013.01)

(58) Field of Classification Search
None
See application file for complete search history.

*Primary Examiner* — Melvin C Mayes
*Assistant Examiner* — Sheng H Davis
(74) *Attorney, Agent, or Firm* — Hartman Global IP Law; Gary M. Hartman; Domenica N. S. Hartman

(57) ABSTRACT

A system and method suitable for the removal of pollutants from gases with a circulating dry scrubber system having a circulating dry scrubber reactor containing a fluidized bed adapted to contact the gas with a dry reagent within the fluidized bed. The system includes a housing fluidically coupled to the reactor, a filter array within the housing, and an internal hopper within the housing and adapted to return at least some of the particulates to the fluidized bed within the circulating dry scrubber reactor. The scrubbed gas stream exits the circulating dry scrubber reactor and flows upward between an interior of the housing and an exterior of the internal hopper before contacting the filter array. The exterior of the internal hopper is exposed to the scrubbed gas stream, and the scrubbed gas stream is not recirculated to the circulating dry scrubber reactor to maintain the fluidized bed therein.

9 Claims, 1 Drawing Sheet

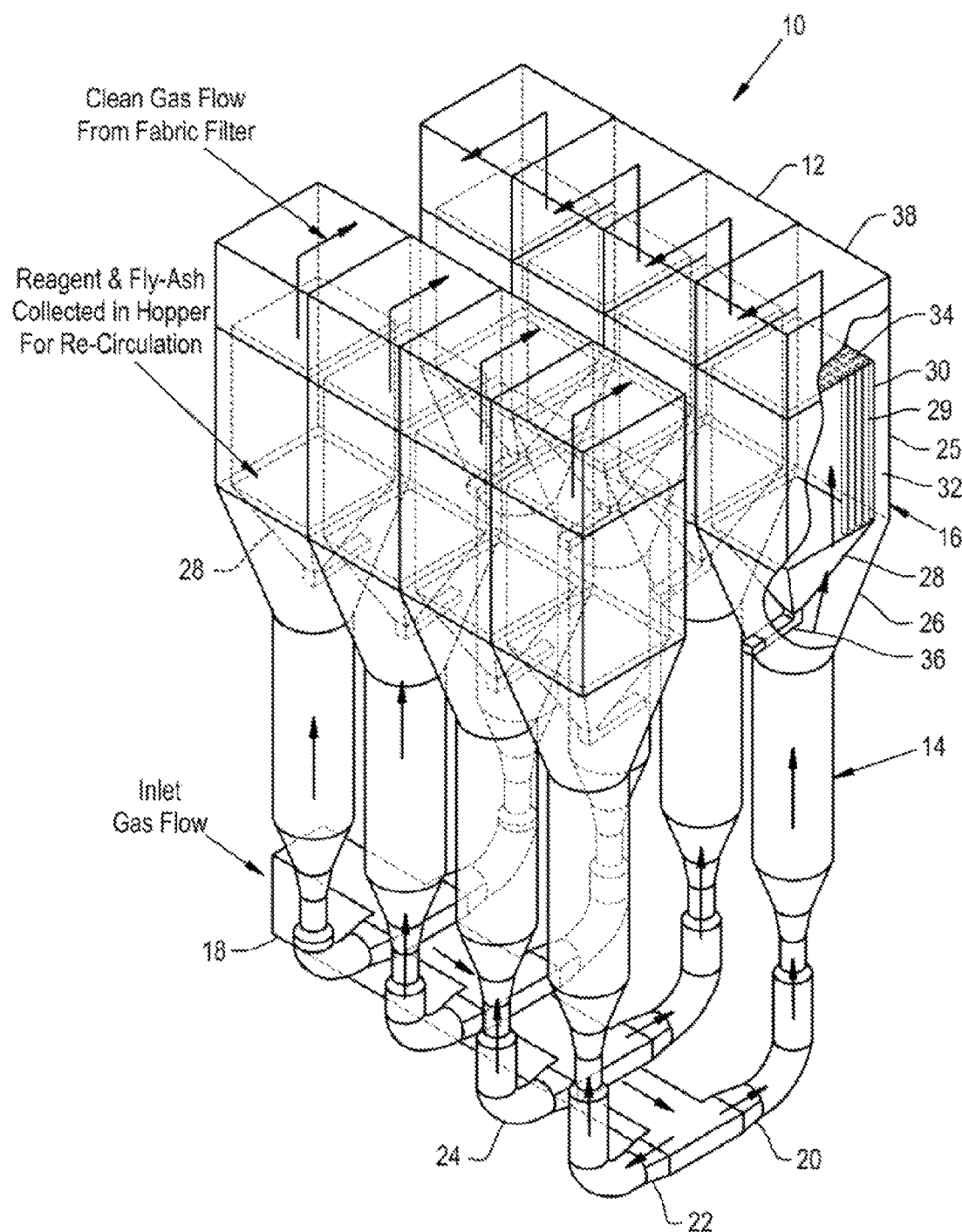

CIRCULATING DRY SCRUBBER SYSTEM AND METHOD

CROSS REFERENCE TO RELATED APPLICATIONS

This is a division patent application of U.S. patent application Ser. No. 14/505,879, filed Oct. 3, 2014, now U.S. Pat. No. 9,327,232, which claims the benefit of U.S. Provisional Application No. 61/886,989, filed Oct. 4, 2013. The contents of these prior applications are incorporated herein by reference.

BACKGROUND OF THE INVENTION

The present invention generally relates to processes used in the removal of pollutants from gases, such as from utility and industrial flue gases. More particularly, this invention is directed to a modular circulating dry scrubber system.

Various processes are used to remove substances such as acidic constituents and particulate matter from combustion or flue gases produced by utility and industrial plants. For example, acidic gases, including sulfur dioxide ($SO_2$), hydrogen chloride (HCl) and hydrogen fluoride (HF), are known to be hazardous to the environment, and as a result their emission into the atmosphere is closely regulated by clean air statutes. Common processes for treating combustion or flue gas include wet or dry flue gas desulfurization (FGD) systems, for example, limestone wet FGD, lime-based spray drying absorption (SDA), and circulating dry scrubber (CDS) systems (also referred to as circulating fluid-bed (CFB) dry scrubbers).

CDS systems use dry sorbent circulation in a reactor (absorber) to achieve capture of pollutants, such as $SO_2$, $SO_3$, HCl, and HF. In typical CDS systems, a dry sorbent (reagent) such as hydrated lime is humidified with water and injected into the bottom of a reactor concurrently with a flue gas to be scrubbed. As it enters the reactor, the flue gas is directed in an upward direction and accelerated through a Venturi before entering a circulating fluidized bed (CFB) portion of the reactor. Within the fluidized bed, contact between the flue gas and humid sorbent results in a high removal efficiency of pollutants from the flue gas. Pollutants such as $SO_2$, $SO_3$, HCl and HF can be removed with hydrated lime to form compounds such as $CaSO_4$, $CaSO_3$, $CaCl_2$, $CaF_2$, etc. The resulting cleaned (scrubbed) flue gas along with the fluid bed solids (particulates including sorbent, sorbent with absorbed pollutants, and fly-ash) exit the top of the reactor and enter a particulate collector (control device), where the fluid bed solids are removed from the scrubbed flue gas stream. The scrubbed flue gas is then typically directed to either a booster or induced draft (ID) fan before being discharged to a stack. Conventionally, a large portion of the sorbent within the fluid bed solids remains unreacted and is recycled back into the reactor as a dry powder to maintain the circulating fluidized bed in the reactor.

Conventionally, a CDS system would be configured to handle the total gas volume from a boiler through one or more venturies in one or more reactors. A particulate control device, such as a multi-compartment fabric filter (FF) or, in some applications, an electrostatic precipitator (ESP), is generally located downstream of each reactor at a significant elevation above grade so that a large quantity of collected fluid bed solids can be recirculated back to the fluidized bed, for example, via air-slides. At certain levels of reduced load, CDS systems further typically require recycling a portion of the scrubbed flue gas to the reactor inlet to maintain the fluidized bed within the reactor. The recirculated scrubbed flue gas may be routed through a gas recirculation duct or similar component from the discharge of the booster or induced draft fan. This recirculated gas is typically at a lower temperature than the incoming flue gas and can adversely affect the overall performance of the air pollution control system. Additionally, the high concentrations of particulate (sorbent and fly-ash) exiting CDS systems have been known to create operational difficulties with inlet dampers upstream of particulate control devices.

In view of the above, it can be appreciated that improvements to CDS systems are continuously sought, a particular example of which would be an improved CDS system capable of operating without relying on the use of recirculated scrubbed flue gas to maintain a fluidized bed within the CDS reactor.

BRIEF DESCRIPTION OF THE INVENTION

The present invention provides systems and methods suitable for the removal of pollutants from gases, and in particular a CDS modularized system that utilizes a fluidized bed to remove pollutants from flue gases and is capable of operating without the use of recirculated scrubbed flue gas to maintain the fluidized bed.

According to a first aspect of the invention, a circulating dry scrubber system for removal of pollutants from a gas includes a circulating dry scrubber reactor containing a fluidized bed adapted to contact the gas with a dry reagent within the fluidized bed. The dry reagent is effective to remove pollutants from the gas and thereby yield a scrubbed gas stream containing particulates comprising the dry reagent. The system includes a housing fluidically coupled to an outlet of the circulating dry scrubber reactor and adapted to receive the scrubbed gas stream flowing upward from the circulating dry scrubber reactor, a filter array within the housing and adapted to remove the particulates from the scrubbed gas stream, and an internal hopper within the housing and adapted to receive the particulates from the scrubbed gas stream and return at least some of the particulates to the fluidized bed within the circulating dry scrubber reactor. The scrubbed gas stream exits the circulating dry scrubber reactor and flows upward between an interior of the housing and an exterior of the internal hopper before contacting the filter array. The exterior of the internal hopper is exposed to the scrubbed gas stream.

According to a second aspect of the invention, an air pollution control system for removal of pollutants from a gas includes more than one circulating dry scrubber module. Each of the circulating dry scrubber modules includes a circulating dry scrubber reactor containing a fluidized bed adapted to contact the gas with a dry reagent within the fluidized bed. The dry reagent is effective to remove pollutants from the gas and thereby yield a scrubbed gas stream containing particulates comprising the dry reagent. The system includes a housing fluidically coupled to an outlet of the circulating dry scrubber reactor and adapted to receive the scrubbed gas stream flowing upward from the circulating dry scrubber reactor, a filter array within the housing and adapted to remove the particulates from the scrubbed gas stream, and an internal hopper within the housing and adapted to receive the particulates from the scrubbed gas stream and return at least some of the particulates to the fluidized bed within the circulating dry scrubber reactor. The scrubbed gas stream exits the circulating dry scrubber reactor and flows upward between an interior of the housing and an exterior of the internal hopper before contacting the filter array. The exterior of the internal hopper is exposed to the scrubbed gas stream.

According to a third aspect of the invention, a method of removing pollutants from a gas with a circulating dry scrubber system having a circulating dry scrubber reactor including a fluidized bed fluidically coupled to a housing having a filter array and an internal hopper within the housing. The method includes treating the gas with the circulating dry scrubber reactor by contacting the gas with a dry reagent within the fluidized bed. The dry reagent is effective to remove pollutants from the gas and thereby yield a scrubbed gas stream containing particulates comprising the dry reagent. The scrubbed gas stream exiting the circulating dry scrubber reactor is directed between an interior of the housing and an exterior of the internal hopper. The exterior of the internal hopper is exposed to the scrubbed gas stream and the scrubbed gas stream is not recirculated to the circulating dry scrubber reactor to maintain the fluidized bed therein. Particulates from the scrubbed gas stream with the filter array are collected and at least some of the particulates are received in the internal hopper and returned to the fluidized bed within the circulating dry scrubber reactor.

A technical effect of the invention is that by directing the scrubbed gas stream flow within the housing around the exterior of the internal hopper, excess particulates may be recirculated to the CDS reactor without requiring a gas re-circulation duct or similar component generally required by conventional systems.

Other aspects and advantages of this invention will be better appreciated from the following detailed description.

BRIEF DESCRIPTION OF THE DRAWINGS

FIG. 1 perspective view representing an air pollution control system that utilizes a modular circulating dry scrubber (CDS) system in accordance with an aspect of the present invention.

DETAILED DESCRIPTION OF THE INVENTION

FIG. 1 represents an air pollution control system 10 suitable for the removal of pollutants from gases, such as from utility and industrial flue gases. The system 10 is represented as comprising eight individual modular circulating dry scrubber (CDS) systems 12 (modules). Each CDS system 12 comprises a dedicated and integrated filter unit 16 so that each CDS system 12 is an individual, modular unit that can be physically isolated (removed and separated) from the air pollution control system 10 and other CDS systems 12 within the air pollution control system 10. The air pollution control system 10 may comprise any number of CDS systems 12.

As represented in FIG. 1, a flue gas may enter the system 10 through an inlet manifold 18. Preferably, the inlet manifold 18 is located at or just above ground level in order to minimize the overall height of the system 10. The inlet manifold 18 is represented as being coupled to a lowermost portion of each individual CDS system 12 by a coupling means schematically represented as a series of ducts comprising a louver-type inlet damper 20, a rectangular-to-round transition and expansion joint 22, and an inlet elbow 24. It will be appreciated that other suitable coupling means are foreseeable and within the scope of this invention. Preferably, the coupling means is adapted to allow each of the CDS systems 12 to be fluidcally isolated from the inlet manifold 18, for example, by closing the louver-type inlet damper 20. The inlet elbow 24 preferably comprises a hopper (not shown) adapted to collect solid particulates (for example, a solid reagent (sorbent) and fly-ash mixture discussed below) that may settle in the inlet elbow 24 when the corresponding CDS system 12 is fluidcally isolated from the inlet manifold 18 or the entire air pollution control system 10 is brought offline.

Each CDS system 12 comprises a reactor (absorber) 14 with its integrated filter unit 16 located approximately vertically in-line above the reactor 14. Each reactor 14 contains a circulating fluidized bed (not shown) that contains a dry or humidified solid reagent (sorbent) whose composition and characteristics are chosen so that contact between the flue gas and reagent results in the removal of pollutants from the flue gas to yield a scrubbed flue gas stream and entrained fluid bed solids, for example, particulates including reacted (spent) reagent, reacted and/or absorbed pollutants, unreacted reagent, fly-ash, etc., as discussed above.

According to a nonlimiting but preferred aspect of the invention, the filter units 16 each comprise a fabric filter, and the vertically in-line arrangement is believed to optimize the space within the conventionally open support structure of the filter unit 16. Each reactor 14 is configured and located relative to the manifold 18 so that flue gases flow upward therethrough, and the upward flue gas flow from the reactor 14 is received in a housing 25 that contains one of the filter units 16 and is fluidically coupled to an outlet of the reactor 14. The flue gas is represented by arrows as being directed through a volume defined between interior surfaces of transition walls 26 of the housing 25 and exterior surfaces of an internal hopper 28 located within a portion of the housing 25 located below its corresponding filter unit 16. Each filter unit 16 is represented as comprising a fabric filter bag array 29 comprising filter bags and cages 30 (only some of which are shown) that are vertically suspended from a cell plate 34 and adapted to collect particulates from the flue gas as the flue gas flows upward through the filter unit 16. Once past an uppermost portion of the internal hopper 28, the gas contacts and passes through the vertical sides of the bags 30 before continuing to flow upward through the cell plate 34 and finally exiting the CDS system 12.

It is believed that this side entry arrangement through the individual filter bags 30 produces a very low upward flow vector (can velocity) within the confines of the bag array 29, that is, the upward velocity of the gas may be reduced by directing the gas to enter at the sides rather than going directly vertical towards the filter bags 30. This low upward flow vector may reduce the amount of particulate that would otherwise be recollected after it has been cleaned from the bags 30 and may result in reduced cleaning of the bags 30, thereby increasing their usable life span. A uniform space 32, characterized by a substantially constant distance between the entire perimeter of the bag array 29 and walls of the housing 25 surrounding the bag array 29, is believed to enhance the flow distribution within the bag array 29 by producing a low velocity zone, allowing heavier particulates to drop into the internal hopper 28 prior to contacting the bags 30 within each bag array 29.

Preferably, at least some, and more preferably, a majority of the particulates fall into the internal hopper 28 and are re-circulated back to the reactor 14 by an unaided gravity system to enable full utilization of the reagent. Alternatively, the particulates may be re-circulated back to the reactor 14 by both the gravity system and air-slides. A slipstream 36 of spent reagent and fly-ash may be directed to a waste silo (not shown) for disposal. With the arrangement disclosed above, the rate of disposal is directly dependent on the rate at which fresh reagent is fed into the reactor 14.

The outlet of each CDS system 12 may include poppet dampers 38 or another suitable means to permit safe isolation of individual or multiple CSD systems 12 during low load operation or for maintenance. After passing the filter bags 30, the scrubbed flue gas may exit the CDS system 12 through an outlet manifold (not shown) and continue downstream towards, for example, an induced draft (I.D.) or booster fan (not shown).

As will be readily understood by those skilled in the art, the above CDS systems 12 may be used to remove pollutants from flue gases by first treating the flue gas with the fluidized bed within the reactor 14, then directing the flue gas exiting the reactor 14 between the interior surface of the walls 26 and the exterior surface of the internal hopper 28, wherein the exterior surface of the internal hopper 28 is directly exposed to the flue gas, and finally collecting particulates from the flue gas with the fabric filter 16 allowing at least some of the particulates received in the internal hopper 28 to return to the reactor 14.

Utilizing the CDS systems 12 as described above provides several benefits over conventional systems. The modular arrangement of each reactor 14, its internal hopper 28, and its integrated filter unit 16 eliminates the need of the conventional practice of recirculating a portion of the scrubbed flue gas stream back to the reactor 14 to maintain the fluidized bed therein under reduced flow conditions, and is believed to provide for improved control of the process during fluctuations in boiler load. The CDS systems 12 may be completely shop-assembled in order to reduce in-field labor costs to erect the air pollution control system 10. The use of the internal hopper 28 eliminates the need for hopper heaters since the internal hopper 28 may be completely encompassed and therefore heated by the hot scrubbed flue gas environment. Due to the reduced quantity of re-circulated particulate under reduced flow conditions, there may be a significant reduction to the reagent/ash load to the support structure and foundations of the CDS systems 12, thereby reducing the need for support structures, air-slides, or similar components. Providing multiple CDS systems 12 within the air pollution control system 10, each directly coupled to a filter unit 16, may produce additional benefits. For example, a single reactor 14 can be brought on line during the early stages of boiler start-up, thus enabling compliance with federal regulations much sooner than conventional air pollution control systems.

While the invention has been described in terms of specific embodiments, it is apparent that other forms could be adopted by one skilled in the art. For example, the physical configuration of the system 10 could differ from that shown, and materials and processes other than those noted could be used. Therefore, the scope of the invention is to be limited only by the following claims.

The invention claimed is:

1. A method of removing pollutants from a gas with a circulating dry scrubber system comprising a circulating dry scrubber reactor comprising a fluidized bed fluidically coupled to a housing comprising a filter array and an internal hopper within the housing, the method comprising:

treating the gas with the circulating dry scrubber reactor by contacting the gas with a dry reagent within the fluidized bed, the dry reagent being effective to remove pollutants from the gas and thereby yield a scrubbed gas stream containing particulates comprising the dry reagent;

directing the scrubbed gas stream exiting the circulating dry scrubber reactor to flow upward and between an interior of the housing and an exterior of the internal hopper, the exterior of the internal hopper being exposed to the scrubbed gas stream and the scrubbed gas stream is not recirculated to the circulating dry scrubber reactor to maintain the fluidized bed therein; and collecting particulates from the scrubbed gas stream with the filter array, wherein at least some of the particulates are received in the internal hopper and returned to the fluidized bed within the circulating dry scrubber reactor.

2. The method of claim 1, further comprising heating the internal hopper with the scrubbed gas stream exiting the circulating dry scrubber reactor.

3. The method of claim 1, wherein gravity returns the particulates to the fluidized bed with the circulating dry scrubber reactor from the internal hopper.

4. The method of claim 1, wherein the filter array is located vertically in-line above the circulating dry scrubber reactor.

5. The method of claim 1, wherein the filter array comprises filter bags adapted to collect particulates from the scrubbed gas stream and the method further comprises directing the scrubbed gas stream to contact and pass through sides of the filter bags after passing an uppermost portion of the internal hopper.

6. The method of claim 1, further comprising reducing the upward flow of the scrubbed gas stream confined within the filter array.

7. The method of claim 1, further comprising providing a substantially constant distance between the interior walls of the housing and an entire perimeter of the filter array.

8. The method of claim 1, wherein the circulating dry scrubber system is a portion of an air pollution control system and the gas is a flue gas.

9. The method of claim 8, further comprising fluidically isolating the circulating dry scrubber system from other portions of the air pollution control system.

* * * * *